(No Model.)

J. J. C. MANDIONI.
LUNCH BOX OR CASE.

No. 489,711. Patented Jan. 10, 1893.

Witnesses:
Tamey N Rasmus
P. Thiele

Inventor:
John J. C. Mandioni
by Fred. Artos
his Atty.

UNITED STATES PATENT OFFICE.

JOHN J. C. MANDIONI, OF CHICAGO, ILLINOIS.

LUNCH BOX OR CASE.

SPECIFICATION forming part of Letters Patent No. 489,711, dated January 10, 1893.

Application filed October 10, 1891. Serial No. 408,377. (No model.)

*To all whom it may concern:*

Be it known that I, JOHN J. C. MANDIONI, a citizen of the United States, and a resident of Chicago, in the county of Cook and State of Illinois, have invented certain new and useful Improvements in Lunch Boxes or Cases; and I do hereby declare that the following is a full, clear, and exact description of the same, such as will enable others skilled in the art to which it appertains to make and use the same.

My invention relates to that type of lunch boxes known as folding or "knock down," and has for its object to provide a box that will be cheap, simple and durable in construction, the parts of which can be formed into a light but strong rectangular box adapted to hold a lunch, and which, after use, can be folded together into an approximately flat condition and stowed away conveniently in a coat pocket without annoyance or inconvenience to the user; and also to provide means whereby ventilation may be afforded so as to keep the contents of the box in good condition, and to dissipate the odors arising from such contents which have a tendency to give the box a disagreeable smell; and it consists in certain novel constructions, combinations and arrangements of parts, as will be hereinafter described and claimed.

Figure 1:
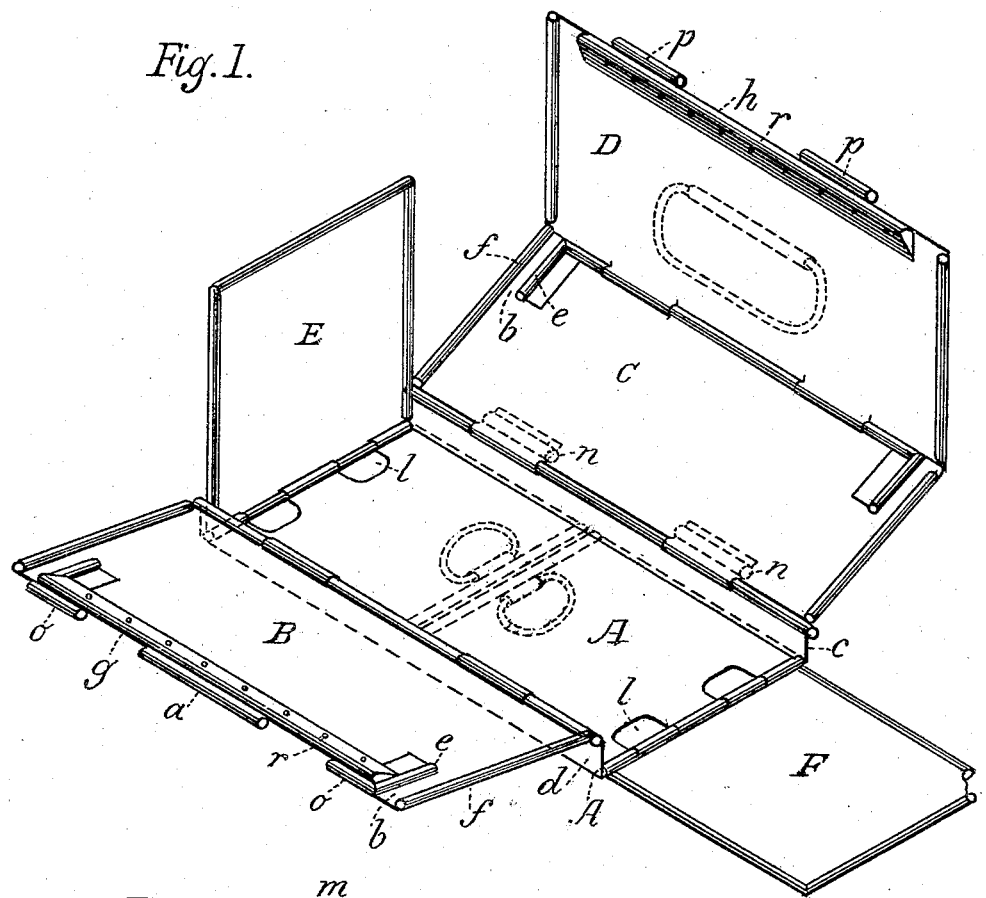
Figure 2:
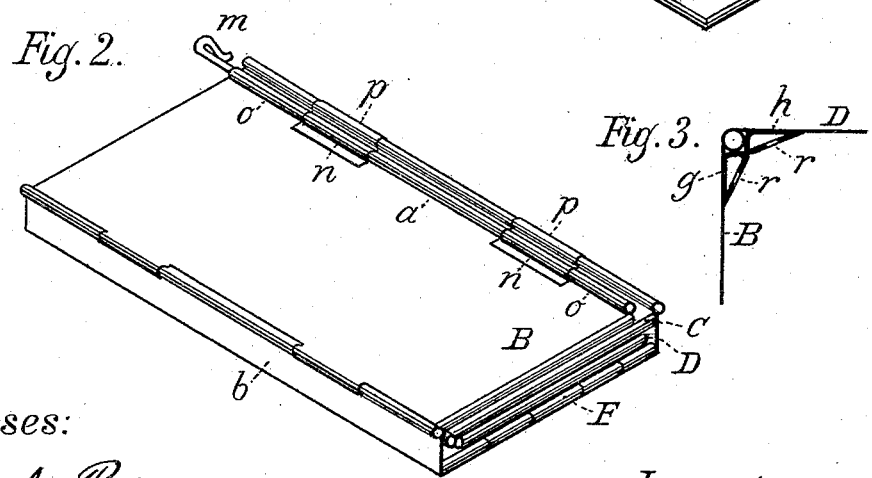
Figure 3:
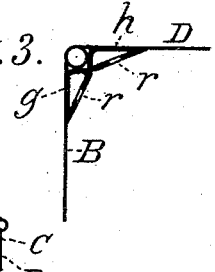

In the accompanying drawings, Figure 1 is a perspective view of the lunch box, showing the same in an unfolded condition, the handles used for carrying the same and the fastening loops being shown in dotted lines. Fig. 2 represents the lunch box in a folded condition and locked by means of a fastening pin or rod, and Fig. 3 is a sectional view of one corner when the parts are in condition to form a box, showing the channel ways and openings for the purpose of ventilation.

A in the drawings represents the bottom or base section of the box, made in rectangular shape and of a suitable length and width, and having its two sides $c, d,$ bent up at right angles thereto. The said sides along their upper edge are formed with open loops or eyes which interlock with similar eyes on the connecting sections, forming hinges by which the parts B and C are connected to the bottom piece, the top piece D being connected with the piece or section C, and the end sections E and F with the base section A, in like manner, as shown. The said base section A is made of a single piece of metal and is provided near each of its ends with holes or perforations $l\ l,$ which serve as a means of ventilating the box. The side section B and cover D are provided with approximately triangular-shaped tubes or hollow panels $h$ having a series of perforations $r\ r$ at regular intervals, which serve as a means of ventilation. The sections B and C are each provided at their upper edges with a ledge $e$ extending downward a suitable distance, and running parallel with the rimmed ends $f,$ said ledges, in conjunction with the said rimmed ends, forming channel ways or grooves $b\ b$ to receive and hold the end pieces E and F securely and rigidly in an upright position when they are turned up to form the box or case.

When it is desired to form the box to hold a lunch, the end sections or pieces E and F are placed in an upright position, the side sections B and C raised and the sides of the end sections fitted into the grooves or channels of sections B and C, connected to plate C, and raised, and when this is done, the section D is folded over the top and fastened to the section B by means of a rod or pin $m,$ which passes through the loops or eyes $p\ p$ of the top plate and $o, a, o$ of the side sections, thus forming a lunch box which is neat in appearance, durable and strong in construction, and which answers all practical purposes. When the box is to be folded, the rod $m$ is withdrawn, the top section turned back, the end sections E and F released from the grooves or channels, and turned down opposite each other, resting flat upon the surface of the bottom section; the side section C and top section D are then doubled up and turned in so as to rest upon the end sections, and finally the section B is turned down, resting on the section C and forming the top of the folded box, the loops $n, n,$ on the section C and similar loops $o, a, o$ on side section B connecting and forming an unobstructed tube or way through which the rod of pin $m$ is passed, securely fastening it, and thus forming an approximately flat box which may be easily secreted in the pocket without annoyance or inconvenience to the user.

In order to provide for the compact folding of the parts together, the bent side portions $c$ and $d$ are made of a height equal to the combined thickness of the end, side and top sections, so that when the same are folded down upon the bottom section they will reach a height to be flush with the top of the bent portions.

What I claim as my invention is:—

1. A lunch box having its sides formed with ventilating tubes $h$ which are provided with side outlet passages $r\,r$, said ventilating tubes serving as a brace for the box and a means by which a current of air can pass entirely from side to side and from end to end through the box, and thereby thoroughly ventilate the same, substantially as described.

2. A lunch box having its sides provided with approximately triangular ventilating tubes $h$ running from side to side thereof, and provided with side outlet passages $r\,r$, openings $l$ in the bottom of said lunch box, and grooves or sockets $b$ on the sides of the box which are adapted to receive and hold the interlocking lips of the end sections, substantially as and for the purpose described.

3. In a folding lunch box, the combination of the base section A, having turned up side portions $c, c$, end sections E and F, side sections B and C, the said section C having the top section D connected therewith, all of said sections being united by loop or eye connections $n, n$, and $o, a, o$, grooves $b$ in side sections B and C to receive and hold the interlocking lips of the end sections E and F, and ventilating and reinforcing tubes $h$, substantially as described.

4. In a folding lunch box, the combination of a bottom section A formed with open ended tube or eye-hinge connections $n, n$, and with upturned flanges, side, end and top sections formed with similar eye connections, the said sections being united together by slipping the eye connections one within the other; and reinforcing and ventilating tubes $h$, substantially as described.

In testimony whereof I have hereunto set my hand in the presence of two subscribing witnesses.

JOHN J. C. MANDIONI.

Attest:
FRED. ARTÓS,
HERBERT A. OLSON.